UNITED STATES PATENT OFFICE.

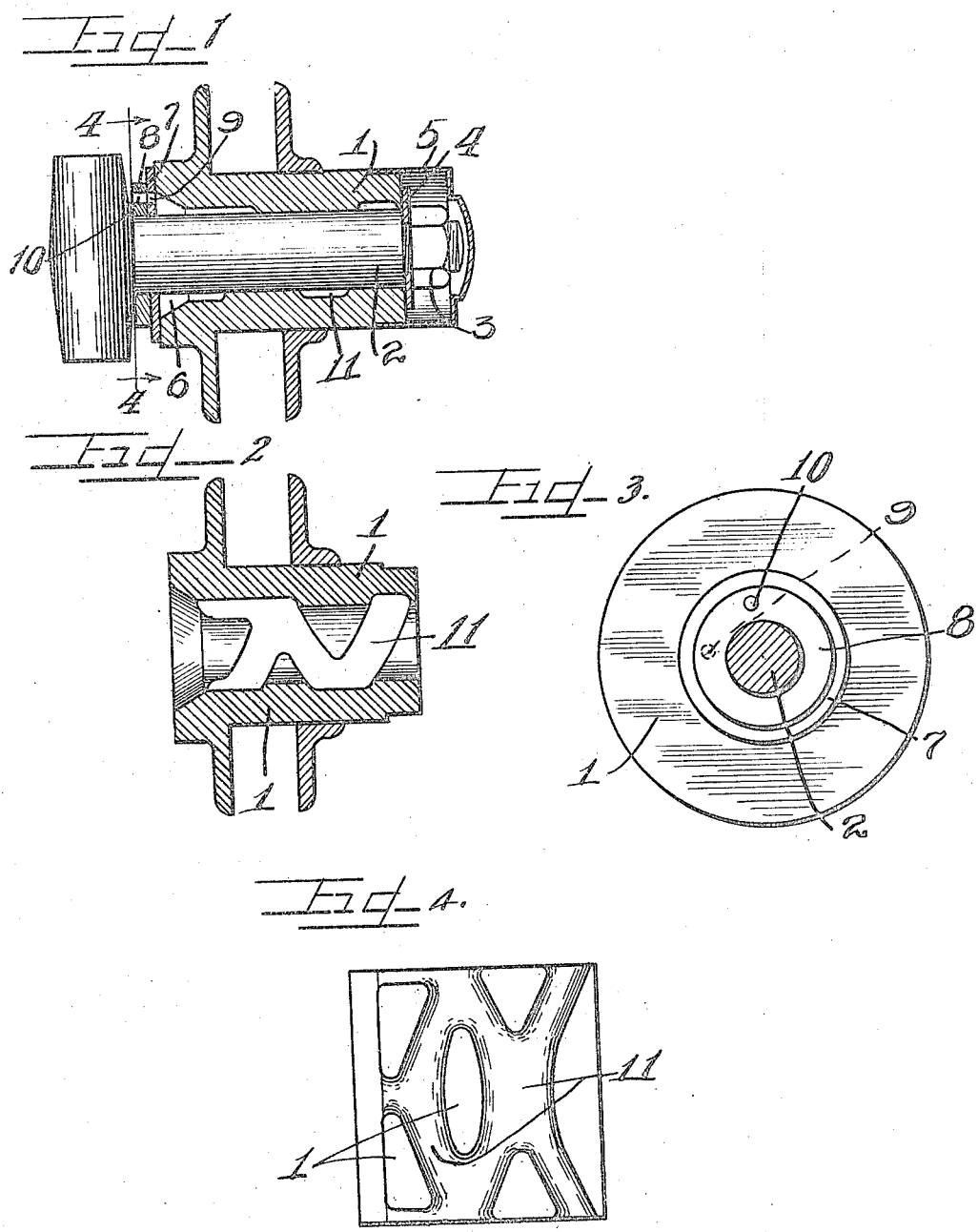

CHESTER G. WOOD, OF CHICAGO, ILLINOIS, ASSIGNOR TO GUILFORD S. WOOD, OF CHICAGO, ILLINOIS.

SELF-OILED MECHANISM.

1,239,548.

Specification of Letters Patent.

Patented Sept. 11, 1917.

Application filed June 21, 1915. Serial No. 35,248.

*To all whom it may concern:*

Be it known that I, CHESTER G. WOOD, a citizen of the United States, and a resident of the city of Chicago, in the county of Cook and State of Illinois, have invented certain new and useful Improvements in Self-Oiled Mechanism; and I do hereby declare that the following is a full, clear, and exact description of the same, reference being had to the accompanying drawings, and to the numerals of reference marked thereon, which form a part of this specification.

Serious accidents are often the result of an improperly oiled bearing and this is more especially true in the case of motor cars or other vehicles where slight attention is paid to the oiling of the wheels on the axles thereof.

This invention relates to means for carrying a certain quantity of excess lubricant within the bearing and to properly feed the same by means of passages to the various portions of the axle to thoroughly lubricate the same.

It is an object of this invention to provide a bearing recessed to carry an excess quantity of lubricating oil or grease within the same without attachments on the exterior thereof such as grease cups or the like.

It is also an object of this invention to construct a device wherein access to the lubricant retaining means is afforded through movable elements which must first be brought into register with one another.

It is also an object of this invention to provide a device wherein a tortuous network of passages surround the axle in a bearing to insure proper transfer of a lubricant to all portions thereof.

It is also an object of this invention to provide a bearing having an enlarged recess at one end thereof, said recess being closed by means of movable closely fitting apertured washers whereby access to the recess in said bearing for the insertion of lubricating elements is only attained by bringing said apertures in proper register with one another.

It is furthermore an object of this invention to construct a device wherein an excess quantity of lubricant is at all times carried in contact with the rotating element within a bearing, and acting by means of a network of passages in said bearing to feed the lubricant thereto as required.

It is finally an object of this invention to construct a device simple in construction and operation and incapable of getting out of order.

The invention (in a preferred form) is hereinafter more fully described and defined in the accompanying drawings and specification.

In the drawings:

Figure 1 is a section taken through a hub of a wheel and showing an axle in elevation.

Fig. 2 is a section through the hub of a wheel with the axle removed.

Fig. 3 is a section taken on line 4—4 of Fig. 1.

Fig. 4 is a diagrammatic view illustrating a development of the interior of a hub or bearing embodying the principles of my invention.

As shown in the drawings:

I have shown my invention adapted to the hub and axle of a wheel, although of course, the bearing mechanism may form a portion of any structure desired. The reference numeral 1, indicates a hub of a wheel, adapted to rotate on a stub axle 2, forming a portion of a steering knuckle, a well known construction in motor car design. The outer end of the stub axle 2, is reduced and threaded to receive a nut 3, thereon, and with a washer 4, engaged therebeneath. Any type of ornamental hub cap 5, may be secured upon the hub 1, to inclose the nut and outer end of the axle as desired.

Referring to Fig. 1, a conical recess is formed on the inner end of the hub 1, to receive a quantity of lubricant. Rotatably fitted on the axle 2, and in close relation therewith are a pair of washers denoted respectively as 7, and 8. Each of said washers are provided with apertures denoted respectively by the reference numerals 9, and 10, which are positioned at the same radius in the respective washers so that the two may be brought into register when desired. When said apertures are brought into register with one another, of course a lubricant may be introduced therethrough to fill the recess 6.

For the purpose of insuring a transfer of the lubricant to the various portions of the bearing the inner surface of the hub 1, is provided with a network of recesses affording passages 11, so that as the wheel rotates about the axle a sufficient supply of lubricant is insured at all portions of the bearing.

I am aware that various details of construction may be varied through a wide range without departing from the principles of this invention. I therefore do not purpose limiting the patent granted otherwise than necessitated by the prior art.

I claim as my invention:

1. In a device of the class described a bearing, a reservoir formed within said bearing, a network of passages communicating therewith adapted to effect a transfer of lubricant to all parts of the bearing, and a plurality of independently rotatable means adapted to be rotated into a predetermined relation to one another to permit admission of a supply of lubricant to said reservoir.

2. In a bearing member an enlarged recess formed on the interior thereof peripherally around the same, affording a reservoir, a network of passages communicating therewith and adapted to effect a transfer of lubricant from said reservoir to the various portions of the bearing, and apertured rotatable closure members for said reservoir adapted when adjusted into a predetermined relation to one another to permit introduction of lubricant into said reservoir.

3. In a bearing an enlarged interior peripheral recess therein, at one end thereof, a shaft extending therethrough, apertured washers engaged on said shaft and closing said recess, and adapted to be rotated so that the apertures in the same may be brought into register with one another to permit insertion of a lubricant into said recess.

4. In a device of the class described a bearing, an enlarged lubricant reservoir formed peripherally on the interior thereof, a shaft extending through said bearing, and a plurality of washers engaged on said shaft and having apertures therein adapted to be brought into register with one another to introduce lubricant into said reservoir.

In testimony whereof I have hereunto subscribed my name in the presence of two subscribing witnesses.

CHESTER G. WOOD.

Witnesses:
 CHARLES W. HILLS, Jr.,
 EARL M. HARDINE.